United States Patent [19]
Ashton et al.

[11] Patent Number: 5,875,481
[45] Date of Patent: Feb. 23, 1999

[54] DYNAMIC RECONFIGURATION OF DATA STORAGE DEVICES TO BALANCE RECYCLE THROUGHPUT

[75] Inventors: Lyn Lequam Ashton; Anthony Steve Pearson; Jerry Wayne Pence; Stephen Charles West, all of Tucson, Ariz.

[73] Assignee: International Business Machines Corporation, Armonk, N.Y.

[21] Appl. No.: 792,826

[22] Filed: Jan. 30, 1997

[51] Int. Cl.⁶ ..................................................... G06F 12/02
[52] U.S. Cl. .......................... 711/165; 711/112; 711/173; 707/206
[58] Field of Search ..................................... 711/165, 162, 711/112, 173, 159; 395/182.04, 872; 707/204, 206

[56] References Cited

U.S. PATENT DOCUMENTS

| | | | |
|---|---|---|---|
| 4,797,589 | 1/1989 | Collins | 370/63 |
| 5,179,666 | 1/1993 | Rimmer et al. | 395/275 |
| 5,367,473 | 11/1994 | Chu et al. | 364/551.01 |
| 5,430,845 | 7/1995 | Rimmer et al. | 395/275 |
| 5,604,902 | 2/1997 | Burkes et al. | 707/206 |

OTHER PUBLICATIONS

*IBM TDB*, vol. 27, No. 4A, Sep. 1984, "Dynamic Multi-Buffering and Asynchronous I/O Performance Enhancements for Data Set Translation", J.A. Aiken, Jr.

*Primary Examiner*—Eddie Chan
*Assistant Examiner*—Hiep T. Nguyen
*Attorney, Agent, or Firm*—Gray Cary Ware & Freidenrich

[57] ABSTRACT

A data processing system includes a data storage subsystem containing a plurality of data storage devices for reading and writing data on a plurality of data storage volumes. The data processing system is controlled by software to perform a method for recycling the data storage volumes containing a percentage of still valid data and a percentage of invalid data by transferring the still valid data on a plurality of input data storage volumes to one or more output data storage volumes. In accordance with the recycling method, the data processing system assigns a selected number of the data storage devices as input devices and a selected number of the data storage devices as output devices in a predetermined input/output ratio of the form m:k, where m is the number of input devices and k is the number of output devices. The system then commences transferring still valid data from input volumes mounted on the input devices to output volumes mounted on the output devices. As each volume is transferred, the system monitors the data transfer efficiency from the input devices to the output devices and adjusts the input/output ratio based on the measured data transfer efficiency.

23 Claims, 6 Drawing Sheets

DYNAMIC RECONFIGURATION OF DATA STORAGE DEVICES TO BALANCE RECYCLE THROUGHPUT

BACKGROUND OF THE INVENTION

1. Field Of The Invention

The present invention is directed generally to data storage in a computerized data processing system, and more particularly, to a recycling process in which valid data sets remaining on old data storage volumes are consolidated to new data storage volumes in order to reuse the old data storage volumes.

2. Description Of The Related Art

A common practice in computer data processing environments (from very small home computers to very large enterprise computers) is to store data sets (e.g. data and program files) onto removable, reusable serial media, such as a tape cartridge (volume). Usually, these data sets are copied or moved to the serial media from a direct access storage device (DASD) such as a disk drive. The process of managing space in primary storage (usually DASD) and secondary or tertiary storage (usually tape) is known as space management. In the MVS (multiple virtual storage) operating system for mainframe computers (MVS is a trademark of International Business Machines), space management for primary storage consists of: partial release, expiration, and migration (in that order). Space management for secondary storage consists of invalidation and recycle. Partial release is the act of releasing unused tracks at the end of a data set. Because MVS requires that all DASD data sets be pre-allocated, there is often the case where a data set is allocated larger than is necessary to hold the data. Partial release returns the unused portions of the data set to the system. Expiration is the act of removing old and unreferenced data sets from the system. When a data set expires, it is deleted from where it resides: Either primary storage or secondary storage. Migration is the act of moving infrequently used data sets from primary storage to secondary storage. The space management system controls when a data set gets migrated to secondary storage. Invalidation is the act of marking data so that it will not be copied during a subsequent recycle. Recycle is the act of copying all remaining valid data from a serially recording media to some other storage media.

The goal of space management is to make sure that storage is being used as effectively as possible. This is accomplished by establishing a storage hierarchy and moving data sets in the hierarchy according to their management classes. The procedures implemented by space management systems are similar to, but distinct from, the procedures known as backup and archival. Backing up is the act of periodically copying data sets, or portions thereof, from primary storage to backup storage in order to create one or more backup versions of the data sets which can be recovered following a disaster event. Archival is the act of saving a specific version of a data set (e.g., for record retention purposes) for an extended period of time. The data set is placed in archive storage pursuant to a command by the system administrator or system user. It does not occur automatically as is usually the case in a backup operation or a migration operation.

When data sets are written from primary storage to secondary storage, each secondary storage volume is written to capacity, removed and replaced with a new volume so that write operations can continued. To access an individual data set, the secondary storage volume is remounted and a high speed position is performed to the correct location.

A secondary storage volume can contain thousands of individual data sets. Over time, data sets become invalid because the data sets are either deleted by their owners, or automatically expired by the system based on age or usage criteria. However, when the secondary storage volume is stored on serial media, which does not have pre-defined, fixed length tracks or sectors as DASD does, the space occupied by the invalid data cannot be reclaimed by overwriting that space with new valid data. Because of variable data set size, compression and imperfections in the media itself, writing over the space freed by the deleted data with new data would run the risk of over-writing adjacent, still valid, data sets. A serial storage volume will thus decline in percentage of valid data, potentially starting out being totally filled with valid data (100% valid), declining to partially valid (1–99% valid) and ultimately becoming entirely invalid (0% valid). Because partially valid volumes are nonetheless "full" in the sense of not being able to accept more data, their storage capacity (of valid data sets) is diminished and it becomes necessary to reclaim the use of the space occupied by the no longer valid data sets.

To regain the use of serial storage media for storing new data, a reclamation process has evolved that transfers valid data from many full, no longer 100% valid volumes, to create a set of newer, fewer, 100% valid volumes. This is the recycle process referred to above. The recycle process moves all valid data from a number of full, partially-valid volumes and rewrites the data onto newer, fewer volumes, thus freeing up a number of volumes for reuse at the expense of using volumes containing only valid data. For example, if there existed ten volumes each with only 10% of the capacity valid, all of this valid data could be sequentially written onto a single volume, thus producing ten empty volumes and a single full volume. Recycle operations may be single tasking or multitasking. In a single tasking recycle operation, two tape drives are allocated. Data is read from a single partially valid input volume mounted on one drive and emptied into a single output volume mounted on the other drive. When the input volume is emptied of all valid data, another input volume is mounted and its valid data is written onto the single output volume. In a multitasking recycle operation, multiple input-to-output drive pairs are concurrently active. With allowance for potential inefficiencies, a multitasking recycle operation yields an enhancement in recycle performance in roughly the proportion of the number of tasks assigned to perform the recycle.

Another aspect of multitasking recycle operations is the concept of a "connected set." A connected set is one or more serially recorded volumes connected by valid spanned data sets. As a volume is being written to (i.e., filled) it sometimes occurs that a data set is partially written to one volume and completed on another volume. This is caused when the first volume is filled and insufficient space exists to complete the writing of the data set to the first volume. The data set is completed on a second volume and the volume pair represents a connected set of volumes. The connected set size (in number of volumes) could grow to any number of volumes if the second, third, etc. volumes are each forced to complete the writing of a data set on the next volume. The data set that is partially written on two or more volumes is called a spanned data set. Whenever a spanned data set is marked invalid, the connected chain is broken and two new connected sets are potentially created, i.e., those volumes still connected by valid spanned data sets to the volume where the spanned data set started are one connected set, and those volumes still connected by valid spanned data sets to the volume where the spanned data set terminated are another connected set. A typical recycle operation treats a connected set as an entity and determines percent valid properties as a function of the total connected set capacity.

One of the drawbacks of conventional recycle operations is that each task owns a dedicated input and output drive. This results in idle, unused drive capacity. For example, if thirty volumes are input and the data is consolidated over to ten output volumes, the output drive would be idle during the times that the input drive is mounting volumes, positioning to the next valid data set, and de-mounting the volumes. Likewise, the input drive would be idle during the times that the output drive must rewind, de-mount and then mount the next output volume. This delays the recycle process and renders the idle drives unavailable for reassignment to other secondary storage operations.

Accordingly, one cannot rely on conventional recycle processes when the efficient transfer of secondary storage data is required. What is needed is an efficient method for improving recycle throughput so that recycle operations are performed more rapidly and the drives used therein are released for other operations as soon as possible.

SUMMARY OF THE INVENTION

In view of the foregoing, the principal object of the present invention is to provide an improved data storage recycling system in which delays resulting from unavailable devices are minimized and data throughput is maximized.

Another object of the present invention is to provide an improved data storage recycling system in which fewer drives are required to accomplish a given amount of work in a given period of time.

Another object of the present invention is to provide an improved data storage recycling system which adjusts automatically to the optimal combination of volumes that are processed in a given order.

Another object of the present invention is to provide an improved data storage recycling system which is capable of using statistics that vary dynamically between various hardware characteristics, such as time spent during rewind and positioning, time spent fetching and mounting volumes, and data transfer rate, etc.

Another object of the present invention is to provide an improved data storage recycling system which is capable of operating with a wide range of hardware devices that have a similar sequence of mount, position, transfer, rewind and de-mount activities.

Another object of the present invention is to provide an improved data storage recycling system which is capable of using a wide variety of media, such as tape reels, tape cartridges, optical platters and floppy diskettes.

Another object of the present invention is to provide an improved data storage recycling system which is capable of operation even when hardware devices are added, upgraded or replaced with newer technologies.

These and other objects are accomplished by a data processing system having a data storage subsystem containing a plurality of data storage devices for reading and writing data on a plurality of data storage volumes. The data processing system is controlled by software to perform a method for recycling the data storage volumes containing a percentage of still valid data and a percentage of invalid data by transferring the still valid data on a plurality of input data storage volumes to one or more output data storage volumes. In accordance with the recycling method, the data processing system assigns a selected number of the data storage devices as input devices and a selected number of the data storage devices as output devices in a predetermined input/output ratio of the form m:k, where m is the number of input devices and k is the number of output devices, for a total of n drives assigned to the recycle operation. The system then commences transferring still valid data from the input volumes mounted on the input devices to output volumes mounted on the output devices. As each input volume is transferred, the system monitors the data transfer efficiency from the input devices to the output devices and adjusts the input/output ratio based on the measured data transfer efficiency.

BRIEF DESCRIPTION OF THE DRAWINGS

The objects, advantages and features of the present invention will be more clearly understood by reference to the following detailed disclosure and the accompanying drawings in which.

DETAILED DESCRIPTION OF THE PREFERRED EMBODIMENTS

A. HARDWARE ENVIRONMENT

Figure 1:
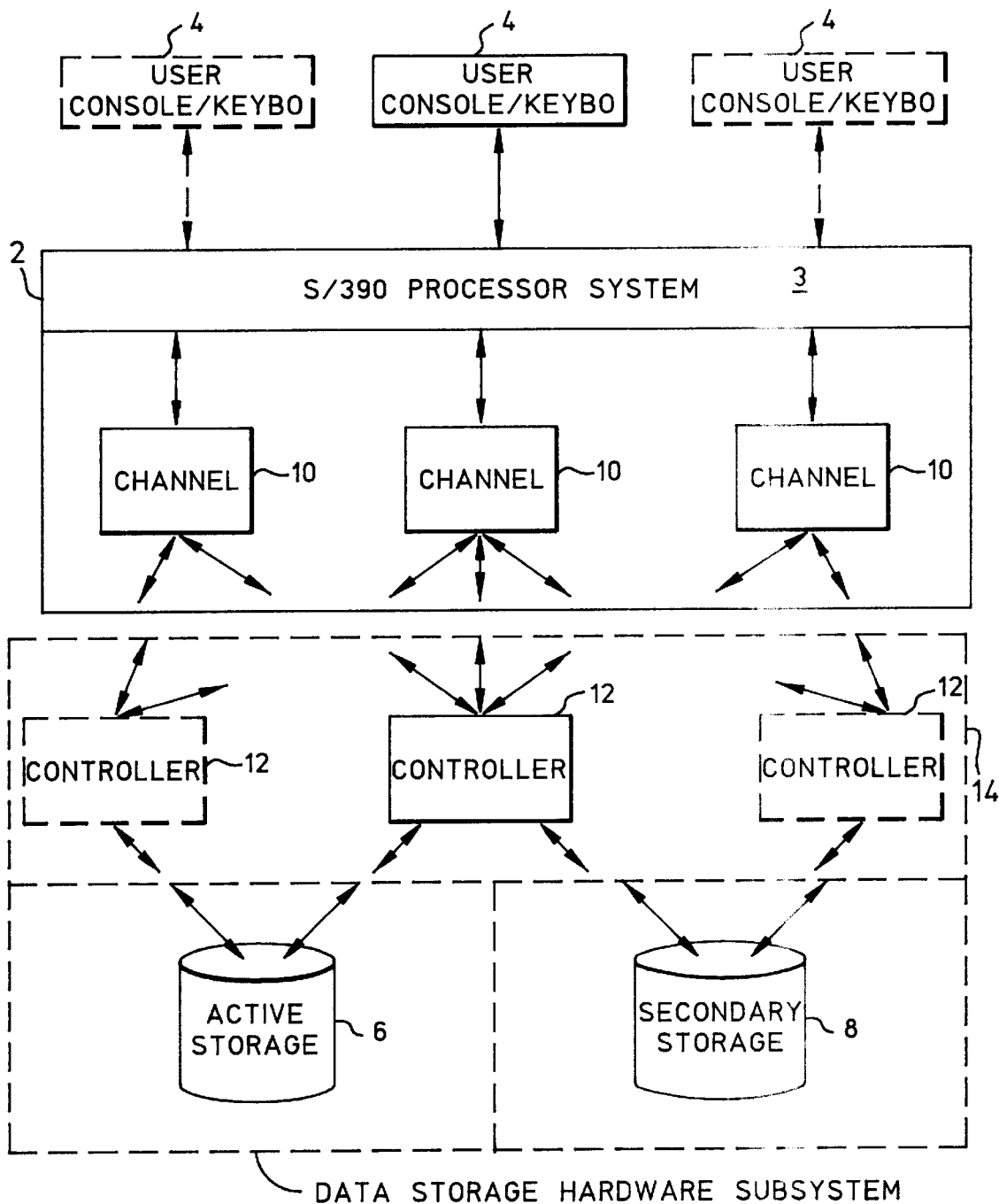
FIG. 1 is a block diagram showing hardware components of a data processing system constructed in accordance with the present invention.

Referring now to the drawings wherein like reference numerals designate like or similar parts throughout the several views, there is illustrated in FIG. 1 a data processing system 2. The data processing system 2 may be provided by any of the well known computer platforms running a variety of well known operating systems. Possibilities include, but are not limited to, personal computers running the OS/2 operating system (OS/2 is a trademark of International Business Machines Corporation), minicomputers running the OS/400 operating system (OS/400 is a trademark of International Business Machines Corporation), and mainframe computers running the MVS or VM operating systems (VM is a trademark of International Business Machines Corporation).

In the preferred embodiment of the present invention, the data processing system 2 is a mainframe system powered by one or more IBM S/390 processors running the MVS/ESA (Multiple Virtual Storage/Enterprise Systems Architecture) operating system (S/390 and MVS/ESA are trademarks of International Business Machines Corporation). The data processing system 2 may include a single IBM S/390 processor 3 or may be formed from a plurality of such processors forming what is known in the art as a processor "sysplex." The architecture of the IBM S/390 processor 3 and the operational characteristics of the MVS/ESA operating system are well documented and need not be described in detail herein. It is sufficient for purposes of the present invention to note that the data processing system 2 allows multiple simultaneous users to provide input to and receive output from the system via multiple console/keyboard units 4 (which may include dumb terminals, smart terminals, other computers, etc.), such that the users are able to run applications that manipulate data stored on one or more storage devices, such as the primary storage repository 6 and the secondary storage repository 8.

The primary storage repository 6 is preferably a logical storage group containing one or more DASD devices that store data sets actively being used by the operating system and the applications running thereunder. These active data sets form a basic data set catalog. The primary storage repository is often referred to as active DASD storage. There are many off-the-shelf products which can be used to provide the active DASD storage, including IBM models 3350, 3370, 3375, 3380 and 3390 (including RAMAC), among others.

The secondary storage repository 8 is preferably either a migration storage repository or a backup storage repository. The secondary storage repository 8 may include a collection of DASD devices and/or tape drives/libraries and/or any other arrangement of suitable and relatively inexpensive storage devices. These devices may employ a variety of media types including magnetic tape reels, magnetic tape cartridges, magnetic disks (hard or floppy), and optical disks having ablative, phase-change, magneto-optic or any other suitable optical recording layers thereon. These secondary storage media may be housed in one or more automated data storage libraries having a plurality of storage cells containing such media, one or more drives to transfer data to and from the media, and robotic picker/gripper mechanisms to physically transport the media between their individual storage cells and the one or more drives. Manual systems could also be used. The secondary storage repository 8 may be provided by a number of commercially available products, including the IBM model 3494 and 3495 Tape Library Dataserver systems.

As is conventional in IBM mainframe systems, requests for data I/O communication between the IBM 390 processor (s) 3 and the data storage repositories 6 and 8 are implemented through one or more I/O channels 10 and one or more controllers 12. The channels 10 execute channel programs written by the operating system for performing I/O requests. The channels 10 pass I/O instructions to the controllers 12 which then implement I/O operations on the storage devices and report back the status of such operations to the operating system. Off-the-shelf products which can be used to provide these components include the IBM model 3830 channel system and the IBM model 3390 family of controller systems, respectively, among others. These devices include local programmable data processors for controlling the I/O functions performed thereby. There are many variations in the way the channels 10, the controllers 12 and the storage repositories 6 and 8 can be arranged to communicate with the IBM 390 processor(s). Persons skilled in the art will recognize that these variations include channel switching and string switching arrangements. For purposes of the remaining discussion, it will be helpful to refer to the combination of the IBM 390 processor(s) 3 and the channel devices 10 as part of a single data processing system 2. Similarly, the combination of the controllers 12, the active DASD storage 6 and the secondary storage 8, will be referred to as a data storage hardware subsystem 14.

B. SOFTWARE ENVIRONMENT

Figure 2:
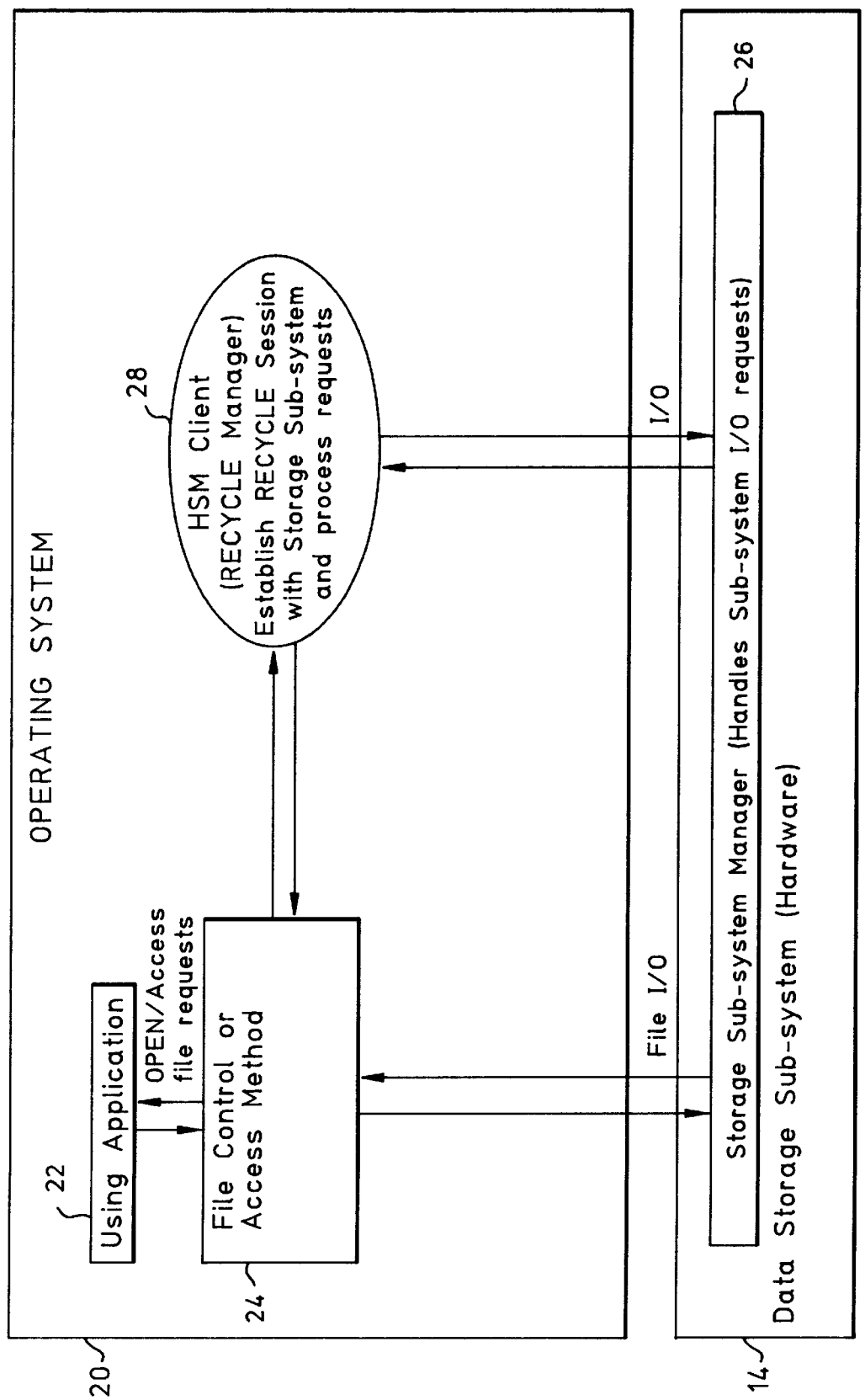
FIG. 2 is a block diagram showing software components of a data processing system constructed in accordance with the present invention.

In FIG. 2, the software side of the data processing system 2 is shown. An MVS operating system 20 provides system services to handle I/O requests from a user application 22 so that the user application can, among other things, send data to and receive data from the data storage hardware subsystem 14. As is conventional, the user application 22 is responsible for defining the file operation to be performed with the data storage subsystem 14 (e.g. Open, Close, Create, Destroy, Copy, Rename, Read, Write, etc.). The operating system 20 provides standard file system services for handling such requests. These services include the provision of queued and basic assess methods, file management, auxiliary storage management and various file integrity mechanisms. A file control and access module 24 performs the operating systems's access methods. A data storage subsystem 26 manager runs on the data storage subsystem 14 and executes I/O requests from the file control and access module 24.

The operating system 20 further includes a hierarchical storage manager (HSM) 28. This software communicates with both the file control and access module 24 and the data storage subsystem manager 26. Among other things, it performs data migration and backup services for the data processing system 2. These services include the recycle operation described above in which still valid migration or backup data located on one or more full, partially valid migration storage or backup storage media in the secondary storage repository 8 are consolidated on one or more completely valid migration storage or backup storage media. Thus, the HSM may also be referred to as a recycle manager for present purposes.

Figure 3:
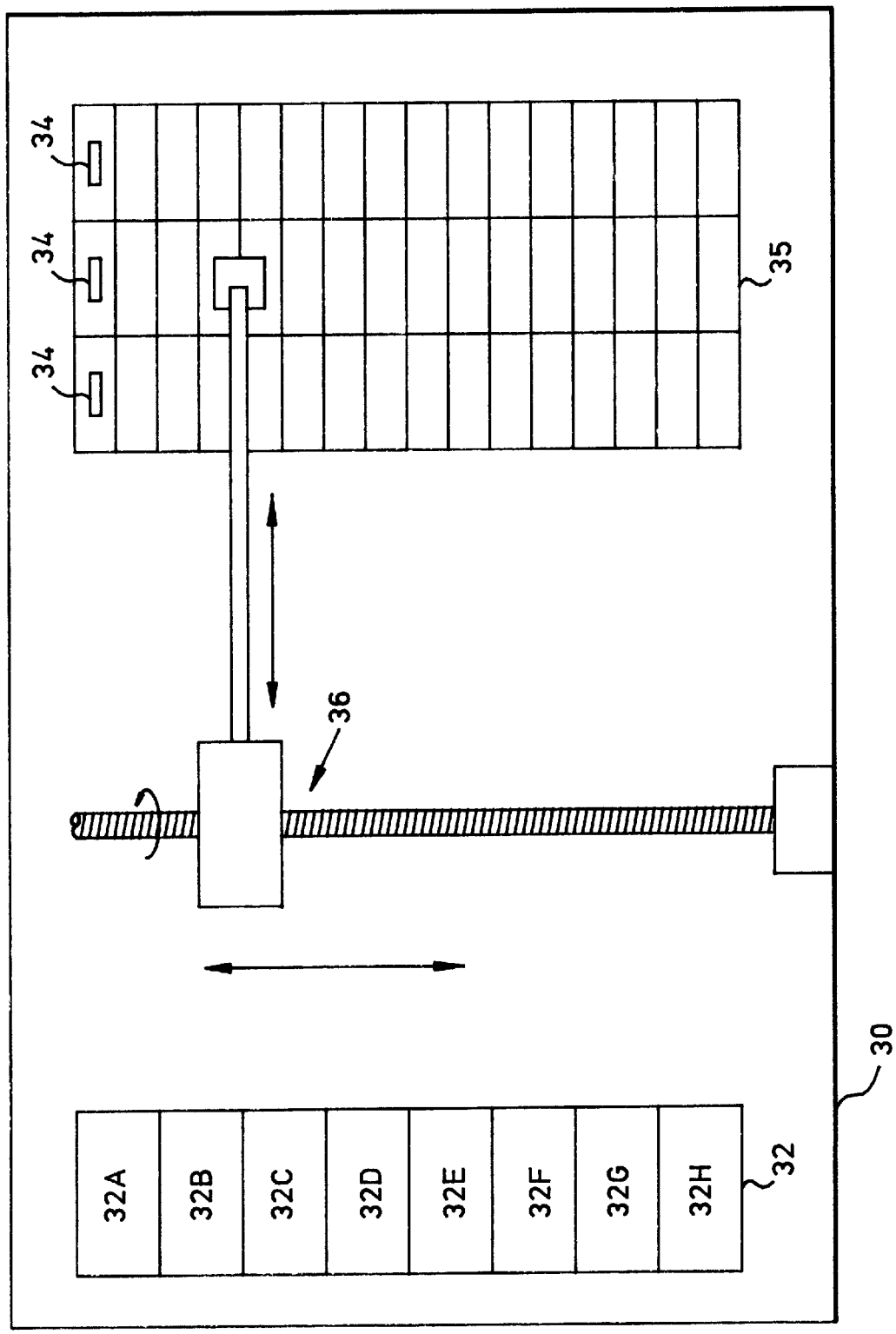
FIG. 3 is a diagrammatic illustration of a data storage library component of the data processing system of FIG. 1.

Referring now to FIG. 3, an exemplary secondary storage repository 8 in the form of a tape library 30 is illustrated. The tape library 30 is conventional in all respects and includes a plurality of tape drive devices (e.g., eight), shown individually by reference numbers 32A–32H, and a plurality of tape cartridge storage volumes 34 (e.g., hundreds), shown collectively in their storage positions by reference number 35. A robotic picker/gripper mechanism 36 is controllable to transfer the storage volumes between their storage positions and the drives 32A–32H.

When it is desired to transfer the contents of one storage volume to another, the robotic mechanism 36 transfers the source volume to one of the drives 32A–32H, which is designated as an "input" drive, and transfers the destination tape cartridge to another one of the drives 32A–32H, which is designated as an output drive. In a conventional recycle operation, the eight tape drives 32A–32H would be grouped into four input/output drive pairs. Each output drive would receive data from a single corresponding input drive. Assuming all eight drives were available for the recycle operation and not occupied by other operations, the "throughput" rate, defined herein as the number of input volumes processed over elapsed time, would be limited because the output drives would be idle much of the time. Throughput is a measure of data transfer efficiency. It is affected by the amount of data to transfer from each input volume, the capacity of the input and output volumes, and the time delay resulting when the input volumes are being fetched, mounted into the devices, readied for reading, and during media positioning to the next valid data set, rewinding, and unmounting. Such a sequence would happen 10 times for every output volume if the input volumes were 10% valid to one output volume. This ratio would be higher for input volumes with less valid data and lower for input volumes with more valid data. Throughput time would be further reduced by the time required for mounting, de-mounting, rewinding, etc., the output volumes from the output drives.

In accordance with the present invention, it has been determined that recycle throughput performance can be significantly enhanced if output drives can be assigned to more than one input drive. The transfer of data becomes an any-to-any relationship. Data from any of the input drives can be transferred to any of the output drives. In addition, provision is made for varying the ratio of input to output drives that are used at different stages in the recycle process. For example, if eight drives are available for recycle processing, they can be assigned in the following combinations:

7 input drives, 1 output drive
6 input drives, 2 output drives
5 input drives, 3 output drives
4 input drives, 4 output drives Because recycle is a data consolidation operation, it is not necessary to have more output drives than input drives. For notational purposes, a combination of input and output drives will be designated as "m:k", where "m" represents the number of input drives and "k" the number of output drives. In the above example, the combinations would be listed as 7:1, 6:2, 5:3 and 4:4, respectively.

The optimum number of input drives to output drives is not usually a fixed value over time. Changing between combinations 7:1, 6:2, 5:3 and 4:4 is best as volumes are processed with different quantities of data. To adjust "up" denotes increasing the number of output drives (while decreasing the number of input drives), e.g., from 7:1 to 6:2. To adjust "down" denotes decreasing the number of output drives (while increasing the number of output drives), e.g., from 4:4 to 5:3. Upward adjustment can occur immediately after the last data set is processed on an input volume (or multiple volumes joined as a connected set). At that time, the input drive can de-mount the volume, the drive can be released as input. The same or a different drive can then be allocated for output and an additional output volume mounted. This maintains a fixed number of drives in use at any given time. Downward adjustment can occur when a data set has been written and the output volume is full enough to justify de-mounting the volume. At that time the drive can be released from output. The same or different drive can then be allocated for input and an additional input volume mounted. The criteria for "full enough" status can be based as a percentage of the amount of data already written to the volume relative to its anticipated capacity (e.g., if the output volume is 97% full). Input volumes that are nearly empty produce a higher throughput (based on the definition of throughput as the number of input volumes processed) than volumes containing more data. Nearly empty volumes (e.g. 1–3% full), would be best served under a high input/output ratio combination so that at least one input drive is always available for processing while others are being mounted, de-mounted, rewound, etc. Volumes that are 20–30% full (or more) would be best served with a lower input/output ratio combination.

C. INPUT/OUTPUT RATIO ADJUSTMENT PROCEDURE

Figure 4A:
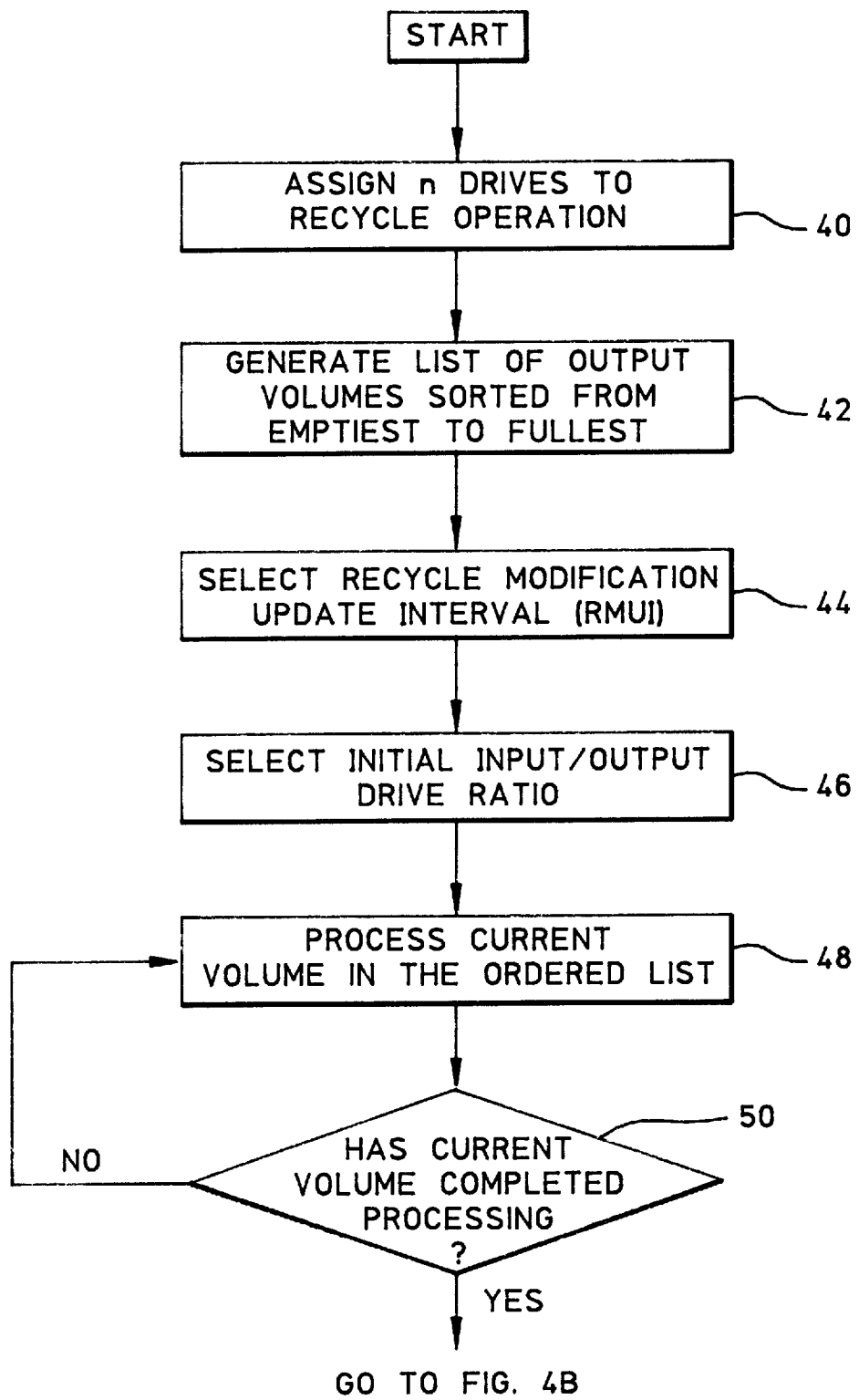
FIG. 4A is a flow diagram showing steps performed by the data processing system of FIG. 1 in accordance with the present invention.
Figure 4B:
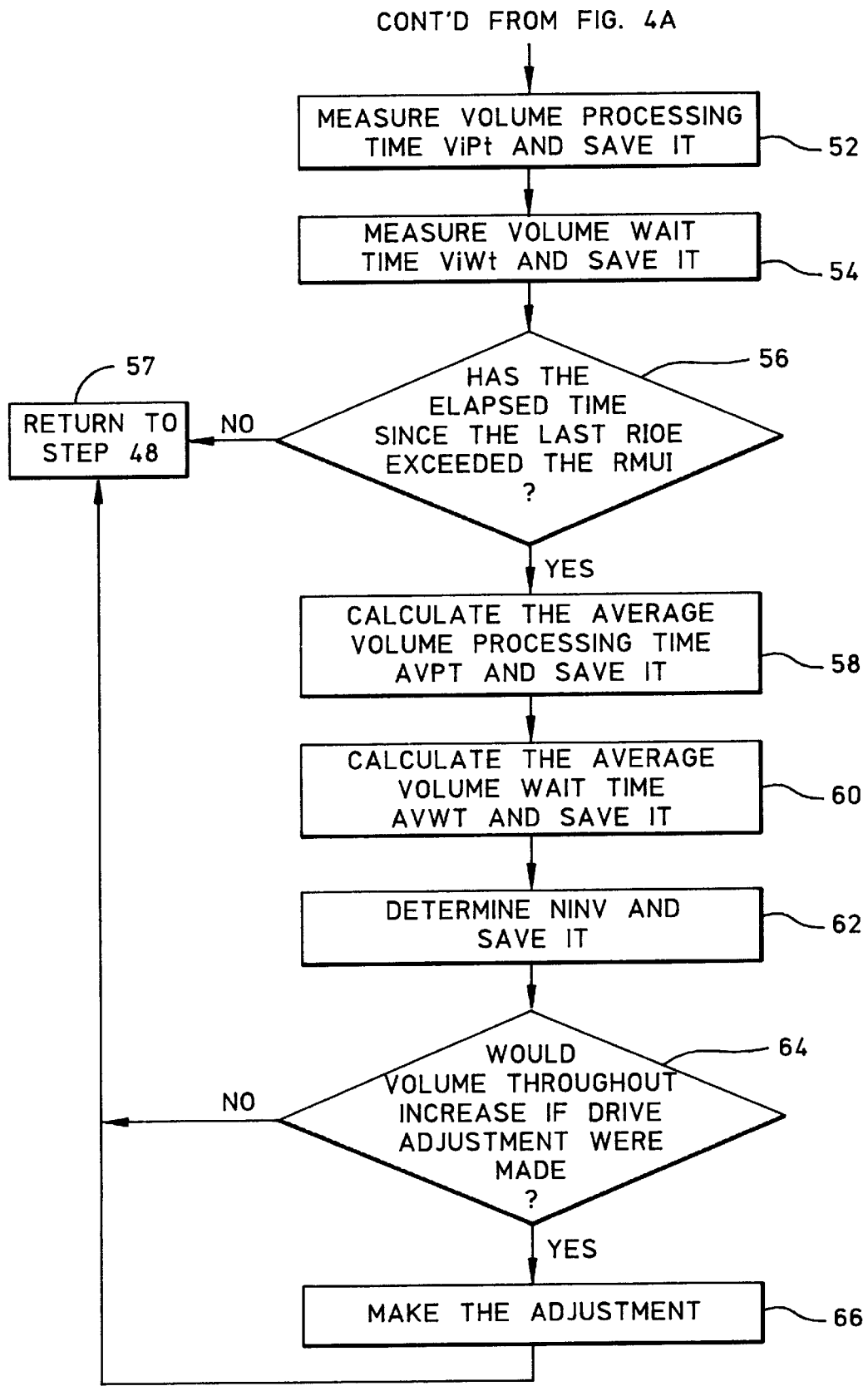
FIG. 4B is a continuation of the flow diagram of FIG. 4A.

A procedure for performing a recycle operation with dynamic adjustment of the input/output device ratio is illustrated in FIGS. 4A–4B. The procedure is preferably implemented by modifying the software in the prior art recycle module of the hierarchical storage manager 28 shown in FIG. 2. In a first step 40, a maximum number of drives n is assigned to the recycle operation. In step 42, a list of input volumes sorted from emptiest to fullest valid connected set, and identified as vl . . . vj, is created. In step 44, a designated Recycle Modification Update Interval (RMUI), in minutes t, is selected to determine the minimum time to spend with a given combination following the last Recycle Input/Output Evaluation (RIOE) before performing another RIOE. This avoids frequent upward and downward adjustments that might undermine the benefits received. In step 46, a beginning input/output drive ratio of (n–x):x is selected (where n is the total number of drive, x is the number of initially allocated output drives, and (n–x) is the number of initially allocated input drives. Volume processing is commenced in step 48.

In the remaining steps, the input/output drive combination is adjusted at certain switch points based on statistics gathered during the processing of the input volumes. The switch point is determined by keeping two measurements of processing efficiency. These measurements are taken after determining in step 50 a volume has completed processing. The first measurement is the volume processing time ViPt, and is performed in step 52. The volume processing time ViPt is the time elapsed from the de-mounting of a previous volume to the de-mounting of the current volume. The second measurement is the volume wait time ViWt, and is performed in step 54. The volume wait time ViWt is the time the input drive spent waiting for an output drive to be available for data transfer. This implies that the input drive had positioned to a valid file, but all output drives were busy processing other requests. Both the volume processing time ViPt and the volume wait time ViWt are saved for each volume processed.

In step 56, the process tests to determine whether the time since the last RIOE has exceeded the RMUI. If not, the process returns to step 48 via step 57 and the next volume is processed. If the RMUI has been exceeded, the process calculates three statistics. First, in step 58, the process calculates an average volume processing time AVPT. The AVPT is determined by averaging the volume processing time ViPt measured for the current volume in step 50 with ViPt values for some number of previous volumes. In step 60, the process calculates an average volume wait time AVWT. The AVWT is determined by averaging the volume wait time ViWt measured for the current volume in step 52 with ViWt values for some number of previous volumes. In step 62, the process determines the number of input drives NINV used to process volumes in the current configuration for which the averages are based. The values AVPT, AVWT and NINV are all saved.

Depending on the values determined for AVPT in step 58, AVWT in step 60, and NINV in step 62, the process either maintains the current drive combination or adjusts the drive combination. It does this by determining in step 64 whether the throughput would increase if an adjustment was made, but does it differently depending on whether the adjustment is to be upward or downward. If no adjustment is required, the process returns to step 48 of FIG. 4A via step 57 of FIG. 4B. If an adjustment is indicated, it is made in step 66.

D. UPWARD ADJUSTMENT METHODOLOGY

If the input volumes are sorted into a list from emptiest to fullest valid connected sets, and recycle processes this list from least to most, it is possible to improve data throughput by selecting an initial input to output drive ratio of (n–1):1, and dynamically adjusting the number of output drives upwardly during processing. When the initial input volumes are processed, the percent of volume processing time that is devoted to data movement (that which keeps the output device busy) is very small when the percent valid is near zero, and grows as the percent valid becomes a larger and larger value. It is submitted, therefore, that the most efficient input to output drive ratio would initially be high and then drop off as fewer input volumes with higher valid data percentages are required to keep the output device(s) busy.

Figure 4C:
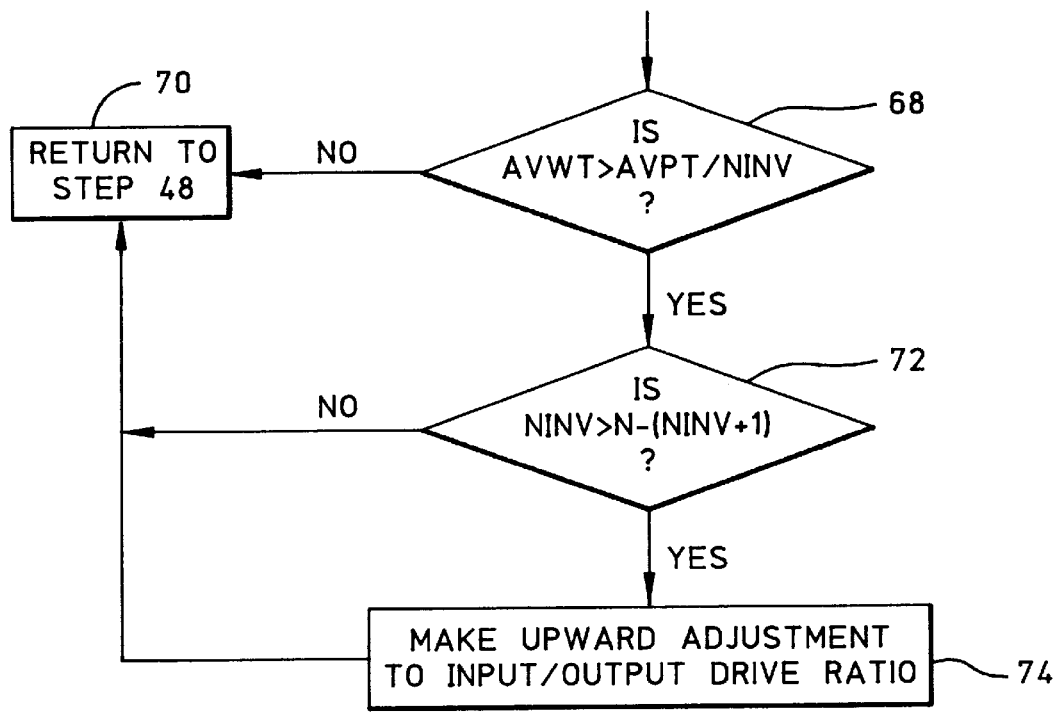
FIG. 4C is a partial flow diagram showing the details of steps shown in the flow diagram of FIGS. 4A–4B in accordance with one aspect of the present invention.

FIG. 4C illustrates a modification of the drive ratio adjustment procedure of FIGS. 4A–4B in which steps 64 and 66 are adapted for upward adjustment. Thus, in step 68 of FIG. 4C, which is performed following step 62 in FIG. 4B, the process determines if volume throughput would be increased by an upward adjustment by testing whether AVWT>AVPT/NINV. If false, the current combination is maintained and the process returns to step 48 of FIG. 4A via step 70 of FIG. 4C. If true, then in step 72 the process determines if the current number of input drives is greater than the current number of output drives plus one by testing whether NINV>N−(NINV+1). If it is, the combination is adjusted upwardly by one drive in step 74, i.e., the upward adjustment will only be performed if the resulting number of input drives is more than or equal to the number of output drives. For example, a 5:4 combination will never be adjusted to 4:5, as this would leave output drives idle even when processing nearly full volumes. After the upward adjustment in step 74, the process returns to step 48 in FIG. 4A via step 70 in FIG. 4C.

The significance of basing the combination switch point on the relationship between AVWT and AVPT/NINV as a measure of throughput increase may be explained using the following model:

1. Assume the current combination is (n−x):x. Thus, NINV=n−x.
2. Upward adjustment would result in (n−x−1): (x+1).
3. AVWT represents the amount of time spent waiting under (n−x):x.
4. AVPT represents the amount of elapsed time spent under (n−x):x.
5. Assume that there would be no wait time under (n−x−1):(x+1), so that AVWT'=0.
6. Assume that elapsed time AVPT under (n−x−1):(x+1) would be reduced by not having to wait, so that AVPT'=AVPT−AVWT.
7. Throughput under (n−x):x is NINV/AVPT.
8. Throughput under (n−x−1):(x+1) is (NINV−1)/AVPT'.
9. Upward adjustment would increase throughput when (NINV−1)/AVPT'>NINV/AVPT.
10. Substituting for AVPT' the foregoing equation becomes (NINV−1)/(AVPT−AVWT)>NINV/AVPT.
11. Rearranging terms, the foregoing equation becomes (AVPT)(NINV−1)>(AVPT−AVWT)(NINV), or more simply, AVWT>AVPT/NINV.

An example with real numbers will help illustrate the above calculations: Suppose a current 5:3 combination has an average processing time of 10 minutes per volume. Thus, in one hour, each input drive can process six volumes, for a total of 30 volumes per hour. Now, suppose that of these 10 minutes, 2.5 minutes are spent waiting for available output capacity, and the other 7.5 minutes are spent actually processing data, and that a 4:4 combination would not cause this wait time. An upward adjustment to a 4:4 combination would reduce the processing time to an estimated 7.5 minutes. Each input drive could then process 8 volumes per hour, for a total of 32 volumes per hour. If desired, a scaling factor could be applied to better control the adjustment switch point. In that case, the equation for upward adjustment becomes:

$$AVWT>(AVPT/NINV)/(SFACT)$$

Normally SFACT would equal one. However, if it was desired to ensure that an adjustment was not made unnecessarily in marginal cases (insofar as the process of adjusting impacts volume throughput), the SFACT value can be set to slightly less than one. If, on the other hand, it is desired to ensure timely adjustment, the SFACT value could be set to slightly greater than one.

E. DOWNWARD ADJUSTMENT METHODOLOGY

By processing volumes sorted from emptiest to fullest and starting with an input/output ratio of (n−1):1, only upward adjustments should be needed in most cases. Alternative implementations that employ a starting point other than (n−1):1 would require both upward and downward adjustments, and may be more complicated than necessary. Nonetheless, it would be desirable to provide for downward adjustment where conditions exist in the user's account such that the current allocation of input and output devices is not as effective as another allocation with more input drive and fewer output drives. There are at least five situations that could lead to this type of imbalance:

The starting point selected by the customer (i.e., some combination other than (n−1):1) contains too many output drives A non-sorted recycle list is input, i.e., the volumes are recycled in an order that is not by least percent valid to most percent valid and the local optimum combination (for the set of volumes being recycled) for the input-to-output allocation varies over time A change in the rate at which new volumes are made ready to be recycled has occurred (e.g., slower human involvement in obtaining the volumes or slower library operation, etc.)

A change in the background load such that contention for resources slows some parts of the recycle process (e.g., a tape library picker or the host cpu or the hierarchical storage manager or a delayed batch job, etc.)

A change in the number of total devices allocated to the recycle function (e.g., an input drive is deallocated or a new drive is allocated to be an output device, etc.).

Figure 4D:
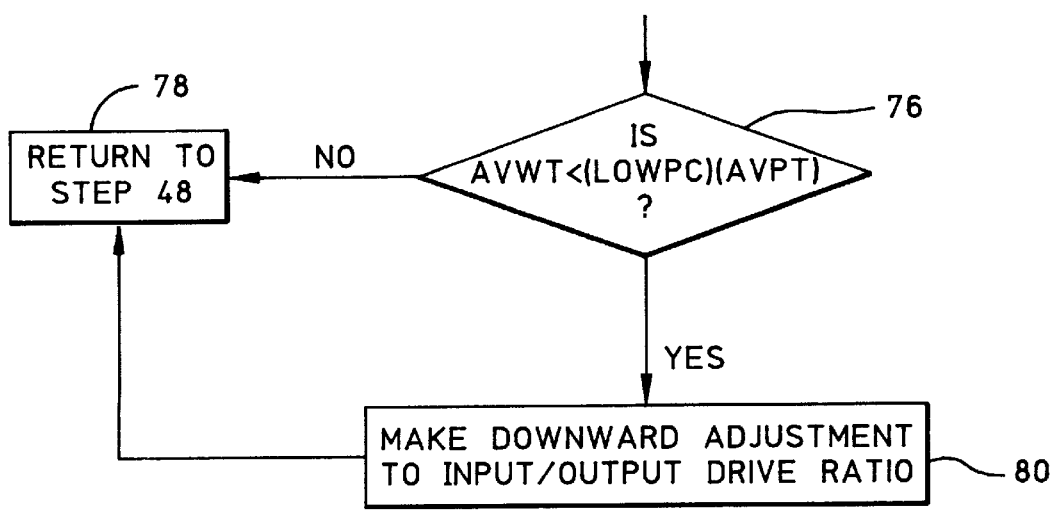
FIG. 4D is a partial flow diagram showing the details of steps shown in the flow diagram of FIGS. 4A–4B in accordance with another aspect of the present invention.

The same parameters used to determine when to assign one of the input drives to be an output drive can also be used to determine when to move an output drive to the input function. For example, when the upward adjustment input-to-output ratio switch point is reached for (n−x):x, the new input-to-output combination (n−x−1):(x+1) will have some wait time but this wait time will be far smaller than the current combination, and will usually be in a very small range close to, but above, zero wait time. In the discussion of upward adjustment, it was noted that no upward adjustment is made if AVWT<=AVPT/NINV, indicating that the average wait time is less than or equal to the average per volume processing time divided by the number of volumes processed and, conversely, that the volume throughput for the current combination is greater than or equal to what it would be if an upward adjustment was made. However, if the current average wait time AVWT is less than a predetermined percent of the per volume processing time AVPT/NINV, a downward adjustment is warranted. This switch point may be expressed as follows:

$$AVWT<(LOWPC)(AVPT)$$

where AVWT is the average volume wait time, LOWPC is a selected percentage of the total per volume processing time, and AVPT is the average volume processing time. FIG. 4D illustrates the process steps for making a downward adjustment. Step 76 follows from step 62 in FIG. 4B and tests whether a downward adjustment is warranted. If it is not, the process returns to step 48 in FIG. 4A via step 78 of FIG. 4D. If a downward adjustment is indicated it is performed in step 80. The process then returns to step 48 in FIG. 4A via step 78 in FIG. 4D.

If the downward adjustment equation is satisfied, a more efficient recycle process can be configured by allocating one of the output drives to be an input drive. An optimum switch point is an LOWPC value of between about 2% and 5%. Below about 2%, reassigning an output drive to be an input drive clearly results in a more efficient process. Above about 5%, it does not benefit process efficiency to reassign an output drive to be an input drive. Between about 2% and 5%, the efficiencies are approximately equal.

F. OUTPUT DEVICE SELECTION METHODOLOGY

There are a number of ways in which an input drive can determine which of the available output drives to write to:

1) Random selection from the set of available devices
2) Round robin selection from the set of available devices
3) Selection of the first available drive from a fixed set ordering of drives
4) Selection of the first available drive from a variable set ordering of drives.

The random selection method uses a pseudo-random number generator to randomize the selection of the next output drive.

The round robin methodology, which is preferred over the random method, maintains an ordered list of the output drives with a pointer to the current "first choice." Whenever an output drive is needed, the current "first choice" is assigned if available. If the current "first choice" is not available, the next device in the ordered list is used if available, and so on. After each assignment, the pointer is advanced to the next drive on the list and this drive becomes the next "first choice." The first drive on the list follows the last device on the list, thus making it a circular list.

There are two variants of the round robin method which may also be used:

Independent of which drive is used, always step the pointer one drive from the previous "first choice"
Always set the pointer to the drive following the drive that was selected.

The third methodology is to always select the first available drive from a fixed ordering of drives, i.e., always select drive #1 if it is available, and if not available, select drive #2, and so on. This method is similar to a very slow round robin method, i.e., the pointer increments off the current drive only when the drive is busy at selection time.

The fourth methodology is a mixture of the round robin and fixed ordering methods. In this method, the "first choice" drive is always selected if it is available. If it is not available, the next device in the list following the "first choice" is used, and so on. This method differs from the Round robin and fixed ordering methods in that the "first choice" pointer does not change until the current "first choice" drive is full and needs to be replaced. At that point, the "first choice" pointer is moved to the next drive on the list. The just-filled drive (i.e., the prior "first choice") is moved to the end of the circular list. This methodology has the potential of pacing the number of output drives being replaced. The nearest most full drive is the next one in line to become the "first choice" device, thus making it the next one to be filled and then replaced. The other methods potentially have all of the output drives being replaced at the same time.

G. FADING MEMORY FILTER ENHANCEMENT

The calculation of the average values for AVWT and AVPT can be performed in a variety of ways. For example, the averages can be a straight average over the last nn hours, or a straight average over the last mm input volumes processed. Alternatively, using a faded memory filter, a weighted average may be calculated, taking the most recent measures with greater importance over older measures. A fading memory filter may be required when the processing and wait times for each input volume include variances that are independent of the quantity or spread of valid data. These variances may result from:

1. Volume fetch time.
    a. Picker contention in an automated library.
    b. Human response time in a manual library.
2. Variations in rewind time.
3. Connected set size.
4. Perturbations caused when an output volume becomes full and must be rewound and unloaded and a new volume mounted and initialized to load point.
5. Variations in tape technologies for the input volumes (if the media is tape).
6. Significant changes to the background load and contention by other data storage processes for resources.

The preferred embodiment of the present invention obtains the average processing time AVPT and the average wait time AVWT over a period of time that will tend to allow the averaging of many volumes, thus moderating the variations that might exist between volumes. These variations can be further moderated by the implementation of a weighted average of the last average (Old Average), and the new sample average (Sample Average), to compute the new weighted average (Weighted Average). The fading memory filter could be implemented as follows:

Weighted Average=((DSF * Old Average)+Sample Average)/(DSF+1) where DSF is a DeSensitization Factor.

If the sample interval is one RMUI (Recycle Modification Update Interval), the use of a DeSensitization Factor has the effect of expanding the sample interval many times but giving the most weight to the most recent sample and progressively less weight as the samples age.

H. BUFFERING

Another variation to the preferred embodiment of the present invention is the introduction of medium to large buffers (e.g., electronic storage, like auxiliary memory, located in the data storage subsystem 14), such that the input does not need to wait for the output. Whenever the output is not available, the input simply writes the data to the buffer. When the output completes its current activity, it writes the next data set from the buffer and continues in this manner until the buffer is drained. At that time, the output can accept a new data set directly from an input device. The addition of buffering provides superior performance over the synchronous or unbuffered implementation described above. As in the unbuffered case, however, a method must be provided for controlling the movement of input drives to the output function (and visa versa). Although it may be possible to determine a switch point by monitoring buffer fullness, the preferred approach is to test using AVWT, as in the unbuffered case.

While various embodiments have been disclosed, it should be apparent that many variations and alternative embodiments would be apparent to those skilled in the art in view of the teachings herein. It is understood, therefore, that the invention is not to be in any way limited except in accordance with the spirit of the appended claims and their equivalents.

We claim:

1. In a data processing system having a data storage subsystem containing a plurality (n) of data storage devices for reading and writing data on a plurality of data storage volumes, a method for recycling data storage volumes of said plurality of data storage volumes which contain a percentage of still valid data and a percentage of invalid data by transferring the still valid data on a plurality of input data storage volumes to one or more output data storage volumes, said method comprising the steps of:

assigning a selected number of said data storage devices as input devices and a selected number of said data storage devices as output devices in a predetermined input/output ratio of the form m:k, where m is the number of input devices, k is the number of output devices and m+k=n;

transferring still valid data from input data storage volumes mounted on said input devices to output data storage volumes mounted on said output devices;

measuring data transfer efficiency from said input devices to said output devices, wherein the data transfer efficiency is a function of an average processing time and an average wait time over a selected number of data storage volumes previously processed; and adjusting said input/output ratio based on the measured data transfer efficiency.

2. The method of claim 1 wherein said data storage volumes are processed in order from data storage volumes containing the lowest percentage of still valid data to data storage volumes containing the highest percentage of still valid data, and wherein said adjusting step includes incrementally increasing the number of output devices and incrementally decreasing the number of input devices.

3. The method of claim 2 wherein said input/output ratio m:k is initially set to m=(n−1) and k=1, such that there is initially only a single output device.

4. The method of claim 3 wherein said monitoring step includes monitoring data storage volume throughput and said adjusting step includes increasing the number of output devices by one device and decreasing the number of input devices by one device when said throughput would increase as a result of said adjustment.

5. The method of claim 4 wherein said monitoring step includes measuring the processing time per data storage volume (ViPt) and the wait time per data storage volume (ViWt) and calculating an average processing time (AVPT) and an average wait time (AVWT) over a selected number of data storage volumes previously processed (NINV).

6. The method of claim 5 wherein said adjusting step is performed to increase the number of output devices by one device and decrease the number of input devices by one device if AVWT>AVPT/NINV and the adjustment would not result in more output devices than input devices.

7. The method of claim 5 wherein said adjusting step further includes incrementally decreasing the number of output devices and incrementally increasing the number of input devices when the average wait time (AVWT) is less than a predetermined percentage of the average data storage volume processing time (AVPT).

8. The method of claim 7 wherein said adjusting step is performed to decrease the number of output devices by one device and increase the number of input devices by one device when said average wait time (AVWT) is equal to or less than about 2%–5% of the average data storage volume processing time AVPT.

9. The method of claim 1 wherein said data transferring step includes selecting an output device to write still valid data to by selecting a first available device from a variable device set ordering.

10. The method of claim 5 wherein said average data storage volume processing time (AVPT) and said average data storage volume wait time (AVWT) are calculated using a fading memory filter.

11. The method of claim 1 wherein said data transferring step includes buffering said still valid data as necessary based on output device availability.

12. A data processing system including a data storage subsystem containing a plurality (n) of n data storage devices for reading and writing data on a plurality of data storage volumes and a recycle control system for recycling data storage volumes of said plurality of data storage volumes which contain a percentage of still valid data and a percentage of invalid data by transferring the still valid data on a plurality of input data storage volumes to one or more output data storage volumes, said recycle control system comprising:

means for assigning a selected number of said data storage devices as input devices and a selected number of said data storage devices as output devices in a predetermined input/output ratio of the form m:k, where m is the number of input devices, k is the number of output devices and m+k=n;

means for transferring still valid data from input data storage volumes mounted on said input devices to output data storage volumes mounted on said output devices;

means for measuring data transfer efficiency from said input devices to said output devices, wherein the data transfer efficiency is a function of an average processing time and an average wait time over a selected number of data storage volumes previously processed; and means for adjusting said input/output ratio based on the measured data transfer efficiency.

13. The data processing system of claim 12 wherein said data storage volumes are processed in order from data storage volumes containing the lowest percentage of still valid data to data storage volumes containing the highest percentage of still valid data, and wherein said adjusting means includes means for incrementally increasing the number of output devices and incrementally decreasing the number of input devices.

14. The data processing system of claim 13 wherein said input/output ratio m:k is initially set to m=(n−1) and k=1, such that there is initially only a single output device.

15. The data processing system of claim 14 wherein said monitoring means includes means for monitoring data storage volume throughput and said adjusting means includes means for increasing the number of output devices by one device and decreasing the number of input devices by one device when said throughput would increase as a result of said adjustment.

16. The data processing system of claim 15 wherein said monitoring means includes means for measuring the processing time per data storage volume (ViPt) and the wait time per data storage volume (ViWt) and means for calculating an average processing time (AVPT) and an average wait time (AVWT) over a selected number of data storage volumes previously processed (NINV).

17. The data processing system claim 16 wherein said adjusting means increases the number of output drives by one device and decreases the number of input drives by one device if AVWT>AVPT/NINV and the adjustment would not result in more output devices than input devices.

18. The data processing system of claim 16 wherein said adjusting means incrementally decreases the number of output devices and incrementally increases the number of input devices when the average wait time (AVWT) is less than a predetermined percentage of the average data storage volume processing time (AVPT).

19. The data processing system of claim 17 wherein said adjusting means decreases the number of output devices by one device and increases the number of input devices by one device when said average wait time (AVWT) is equal to or less than about 2%–5% of the average data storage volume processing time AVPT.

20. The data processing system of claim 12 wherein said data transferring means includes means for selecting an output device to write still valid data to by selecting a first available device from a variable device set ordering.

21. The data processing system of claim 16 wherein said average data storage volume processing time (AVPT) and said average data storage volume wait time (AVWT) are calculated using a fading memory filter.

22. The data processing system of claim 12 wherein said data transferring means includes means for buffering said still valid data as necessary based on output device availability.

23. In a data processing system having a data storage subsystem containing a plurality of n data storage devices for reading and writing data on a plurality of data storage volumes, a method for recycling said data storage volumes containing a percentage of still valid data and a percentage of invalid data by transferring the still valid data on a plurality of input data storage volumes to one or more output data storage volumes, said method comprising the steps of:

assigning a selected number of said data storage devices as input devices and a selected number of said data storage devices as output devices in a predetermined input/output ratio of the form m:k, where m is the number of input devices, k is the number of output devices and m+k=n, said input/output ratio m:k being initially set to m=(n−1) and k=1, such that there is initially only a single output device;

arranging said data storage volumes for processing in order from data storage volumes containing the lowest percentage of still valid data to data storage volumes containing the highest percentage of still valid data;

transferring still valid data from input data storage volumes mounted on said input devices to output data storage volumes mounted on said output devices;

monitoring the data transfer efficiency from said input devices to said output devices, including measuring the processing time per data storage volume (ViPt). and the wait time per data storage volume (ViWt) and calculating an average processing time (AVPT) and an average wait time (AVWT) over a selected number of data storage volumes previously processed (NINV); and adjusting said input/output ratio by incrementally increasing the number of output devices and incrementally decreasing the number of input devices when said throughput would increase as a result of said adjustment if AVWT>AVPT/NINV and the adjustment would not result in more output devices than input devices, and refraining from adjusting said input/output ratio if AVWT<=AVPT/NINV or if the adjustment would result in more output devices than input devices.

* * * * *